US007787465B2

(12) United States Patent
Batz et al.

(10) Patent No.: US 7,787,465 B2
(45) Date of Patent: *Aug. 31, 2010

(54) SYSTEM AND METHOD FOR PROVIDING SOURCE AWARENESS IN A WIRELESS APPLICATION PROTOCOL NETWORK ENVIRONMENT

(75) Inventors: Robert M Batz, Raleigh, NC (US); Chris O'Rourke, Apex, NC (US)

(73) Assignee: Cisco Technology, Inc., San Jose, CA (US)

(*) Notice: Subject to any disclaimer, the term of this patent is extended or adjusted under 35 U.S.C. 154(b) by 894 days.

This patent is subject to a terminal disclaimer.

(21) Appl. No.: 11/458,123

(22) Filed: Jul. 18, 2006

(65) Prior Publication Data

US 2006/0248225 A1 Nov. 2, 2006

Related U.S. Application Data

(63) Continuation of application No. 10/075,830, filed on Feb. 12, 2002, now Pat. No. 7,120,148.

(51) Int. Cl.
*H04L 12/28* (2006.01)
*H04L 12/56* (2006.01)
*H04J 3/24* (2006.01)

(52) U.S. Cl. ............... 370/392; 370/351; 370/360; 370/389; 370/401; 370/474

(58) Field of Classification Search ............... None
See application file for complete search history.

(56) References Cited

U.S. PATENT DOCUMENTS

| 5,905,736 | A | | 5/1999 | Ronen et al. ............... 370/546 |
|---|---|---|---|---|
| 5,956,391 | A | | 9/1999 | Melen et al. ............... 379/114 |
| 5,956,698 | A | * | 9/1999 | Lacheze et al. ............... 705/34 |
| 5,970,477 | A | | 10/1999 | Roden ............... 705/32 |
| 6,047,051 | A | | 4/2000 | Ginzboorg et al. ............... 379/130 |
| 6,230,012 | B1 | | 5/2001 | Willkie et al. ............... 455/435 |
| 6,275,575 | B1 | | 8/2001 | Wu ............... 379/202.01 |
| 6,466,571 | B1 | | 10/2002 | Dynarski et al. ............... 370/352 |
| 6,490,291 | B1 | | 12/2002 | Lee et al. ............... 370/401 |
| 6,636,894 | B1 | | 10/2003 | Short et al. ............... 709/225 |
| 6,751,453 | B2 | | 6/2004 | Schemers et al. ............... 379/88.14 |
| 6,868,399 | B1 | | 3/2005 | Short et al. ............... 705/34 |
| 7,120,148 | B1 | | 10/2006 | Batz et al. |
| 2002/0059114 | A1 | | 5/2002 | Cockrill et al. ............... 705/27 |

FOREIGN PATENT DOCUMENTS

| WO | WO 98/26381 | 12/1997 |
|---|---|---|
| WO | WO 99/31610 | 12/1998 |

* cited by examiner

*Primary Examiner*—Ayaz R Sheikh
*Assistant Examiner*—Blanche Wong
(74) *Attorney, Agent, or Firm*—Baker Botts L.L.P.

(57) ABSTRACT

A method for communicating in a wireless application protocol (WAP) network environment is provided that includes receiving a request packet at a WAP gateway and positioning an identifier into the request packet. A content switch then identifies the identifier and correlates the identifier to a source that generated the request packet. An internet protocol (IP) address associated with the source is positioned in the request packet before communicating the request packet to a next destination.

17 Claims, 2 Drawing Sheets

SYSTEM AND METHOD FOR PROVIDING SOURCE AWARENESS IN A WIRELESS APPLICATION PROTOCOL NETWORK ENVIRONMENT

CROSS REFERENCE TO RELATED APPLICATION

This application is a continuation of U.S. application Ser. No. 10/075,830 filed Feb. 12, 2002 and entitled "Method and System for Providing Source Awareness In A Wireless Application Protocol Network Environment."

TECHNICAL FIELD OF THE INVENTION

This invention relates in general to the field of network communications and more particularly to a system and method for providing source awareness in a wireless application protocol network environment.

BACKGROUND OF THE INVENTION

Networking services have become increasingly important in today's society. One feature of networking services relates to client or source awareness. Certain services, functions, or capabilities may be provided to a group of end users or to clients based on a corresponding source profile. Devices or components within a network must generally be able to identify such a source profile before offering selected enhanced services, functions, or capabilities to a targeted group of end users. Accordingly, sufficient information must be made available at various networking layers in order to allow for accurate identification of a client or a source.

In some environments, the source identification may be hidden or otherwise transformed such that the original source is hidden from the perspective of the destination point that receives a message. This translates into a device or a component that receives the message being generally unable to determine a point of origin associated with the data request. This blindness or shielding creates a problem in attempting to offer services to a select group of users based on their source profiles. In some instances, the inability to determine the origination of a data flow precludes a device or a component from offering services based on the identity of an end user.

SUMMARY OF THE INVENTION

From the foregoing, it may be appreciated by those skilled in the art that a need has arisen for an improved communications approach that provides the capability for devices or components to identify a source associated with a request packet in a wireless application protocol (WAP) network environment. In accordance with one embodiment of the present invention, a system and method for providing source awareness in a WAP network environment is provided that substantially eliminate or greatly reduce disadvantages and problems associated with conventional source awareness techniques.

According to an embodiment of the present invention, there is provided a system for providing source awareness in a WAP network environment that includes receiving a request packet at a WAP gateway and positioning an identifier into the request packet. A content switch identifies the identifier and correlates the identifier to a source that generated the request packet. An internet protocol (IP) address associated with the source is positioned in the request packet before communicating the request packet to a next destination.

Certain embodiments of the present invention may provide a number of technical advantages. For example, according to one embodiment of the present invention, a communications approach is provided that allows a device or a component within a network environment to identify a source associated with the request packet that it received. This allows receiving devices and components within the network environment to provide authentication, authorization, and accounting elements to a group of end users. Additionally, this identification allows receiving elements to offer networking features or capabilities to a source based on the corresponding source IP address. These enhanced services may key off a unique identifier that is positioned within an information packet as it propagates through the network environment. The unique identifier allows devices or components that later receive the request packet to correlate a source profile of an end user with the request packet. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
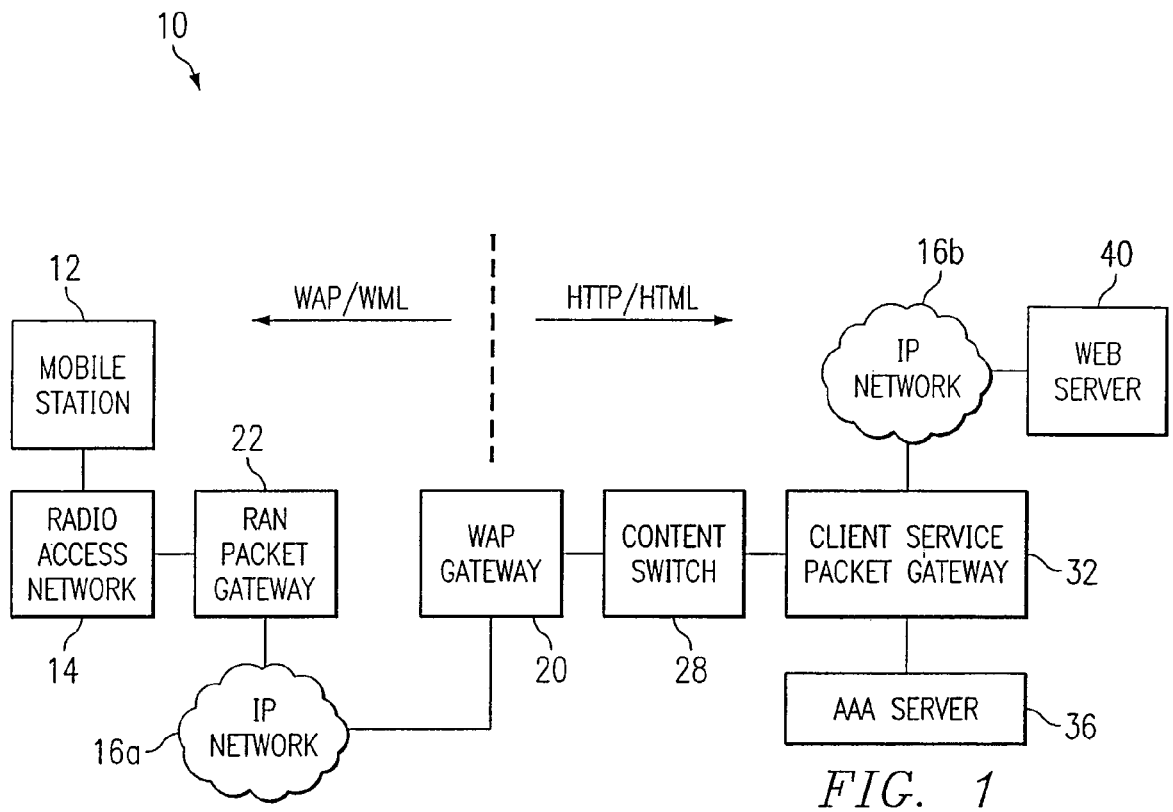
FIG. 1 is a simplified block diagram of a system for providing source awareness in a wireless application protocol (WAP) network environment.

FIG. 1 is a simplified block diagram of a communication system 10 for providing source awareness in a wireless application protocol (WAP) network environment in accordance with one embodiment of the present invention. Communication system 10 includes a mobile station 12, a radio access network (RAN) 14, multiple internet protocol (IP) networks 16a and 16b, a WAP gateway 20, and a RAN packet gateway 22. Communication system 10 also includes a content switch 28, a client service packet gateway (CSPG) 32, an authentication, authorization, and accounting (AAA) server 36 and a web server 40.

According to the teachings of one embodiment of the present invention, WAP gateway 20 operates to position a unique identifier into a request packet generated by mobile station 12. The unique identifier may be identified by content switch 28 which correlates the unique identifier with a source profile associated with an end user of mobile station 12. The source profile may contain any end user parameters or source characteristics that provide an identity of an end user or a source to networking components, devices, equipment, and elements. Content switch 28 may then replace the source IP address in the request packet with the source IP address of mobile station 12 (or some source IP address representing mobile station 12) before communicating the request packet to a next destination. This translation of the source IP address (from WAP gateway 20 to mobile station 12) allows elements, components, or objects that receive the request packet from content switch 28 to properly identify a point of origin associated with the request packet. This allows particular services, features, or capabilities to be provided to end users based on their source profile as matched by content switch 28 to their unique identifier included within the request packet.

Mobile station 12 is a communications interface for an end user of mobile station 12 and multiple IP networks 16a and 16b. Mobile station 12 may be a cellular (or wireless) telephone, a computer, a personal digital assistant (PDA), a laptop or electronic notebook, or any other device, component, or object capable of initiating voice or data exchanges within communication system 10. In addition to executing radio or processing functions to access IP networks 16a or 16b through a radio interface, mobile station 12 may also provide an interface to the human user, such as via a microphone, a display, or a keyboard or other terminal equipment (such as for example an interface to a personal computer or to a facsimile machine in cases where mobile station 12 is used as a modem). An end user as referred to in this document generally represents a person wishing to initiate a data exchange within communication system 10. However, the end user may be any cellular component, a computer, a program, a database, or any other device, element, or object capable of initiating a voice or a data exchange within communication system 10.

Mobile station 12 is coupled to RAN 14. RAN 14 includes a base transceiver station and a base station controller in a particular embodiment of the present invention. RAN 14 offers an interface between mobile station 12 and IP networks 16a or 16b. This interface allows data to be exchanged between mobile station 12 and any number of selected elements within communication system 10. Data, as used herein in this document, refers to any type of numeric, voice, or script data, or any other suitable information in any appropriate format that may be communicated from one point to another.

The base transceiver station may comprise radio transmission/reception devices, components or objects, and antennas. The base transceiver station may operate as a series of complex radio modems and may assist in performing suitable networking tasks where appropriate. The base transceiver station within RAN 14 may be coupled to a base station controller that uses a land line (such as for example a high speed T1/E1 link) interface. The base transceiver station may also perform transcoding and rate adaptation functions where appropriate. The base station controller may be provided within RAN 14 to operate as a management component for a radio interface. This may be accomplished through remote commands to the base transceiver station.

In operation the base transceiver station within RAN 14 provides transmit and receive interface links for communication system 10. One or more base transceiver stations may receive information from mobile station 12 in the form of data packets and communicate the data packets or information to corresponding base station controllers. The base station controllers work in conjunction with the base transceiver stations in order to provide a link or interface between mobile station 12 and IP networks 16a or 16b. Base station controllers may then communicate data packets or information received from the base transceiver station to a network component within communication system 10.

The base transceiver station within RAN 14 is a radio transmission and reception station for handling communications traffic. The base transceiver station may also be identified as a cell site, primarily so because it may hold one or more transmit/receive cells. One or more base transceiver stations within communication system 10 may comprise one or more receive/transmit antennas, a base station controller, a microwave dish, and suitable associated electronic circuitry.

IP networks 16a and 16b each represent a series of points or nodes of interconnected communication paths for receiving and transmitting packets of information that propagate through communication system 10. In a particular embodiment, IP networks 16a or 16b may represent a packet data network (PDN). IP networks 16a and 16b offer a communications interface between RAN 14 and one or more web servers 40. IP networks 16a and 16b may be any local area network (LAN), metropolitan area network (MAN), or wide area network (WAN) or any other appropriate architecture or system that facilitates communications in a network environment. IP networks 16a and 16b implement a transmission control protocol/internet protocol (TCP/IP) communications language architecture in a particular embodiment of the present invention. However, IP networks 16a and 16b may alternatively implement any other suitable communication protocol for transmitting and receiving data packets within communication system 10.

WAP gateway 20 is a network point or node that operates as a data exchange interface between IP network 16a and content switch 28. WAP, as referred to herein in this document, generally represents a specification for a set of communication protocols to standardize the way that wireless devices can be used for Internet access, including e-mail, the world wide web, newsgroups, and internet relay chat. The associated WAP communications layers are generally wireless application environment (WAE), wireless session protocol (WSP), wireless transport layer security (WTLS), and wireless transport protocol (WTP).

WAP gateway 20 allows a device or component, such as for example mobile station 12, to initiate a request from IP network 16a and may then generally facilitate the delivery of the requested data back to a source or an end user associated with mobile station 12. Such data may be translated into a WAP format or any other suitable format, such that the source of the requested data may be able to interpret the information properly or such that the requested data may be adequately displayed on a suitable device or component. In a particular embodiment of the present invention, WAP gateway 20 retrieves and translates (or transcodes) information from a network for viewing by an end user of mobile station 12. Such information could be a web page for example, where WAP gateway 20 operates to convert such data into a configuration (such as a card format) that is displayable to mobile station 12. As illustrated by arrows in FIG. 1, WAP gateway 20 converts pages retrieved from the network into WML (Wireless Markup Language) in accordance with a particular embodiment of the present invention. WML, also referred to as HDML (Handheld Devices Markup Languages), is a language that allows the text portions of web pages to be presented on cellular/wireless telephones and personal digital assistants (PDAs) via http://searchnetworking.techtarget.com/sDefinition/0,,sid7_gci213380,00.html wireless access.

Information provided to WAP gateway 20 by IP network 16b is generally in a hyper-text transfer protocol (HTTP)/hyper-text markup language (HTML) format as illustrated by the arrow in FIG. 1. HTTP represents a platform for exchanging files (text, graphic images, sound, video, and other multimedia files) on the world wide web http://searchcrm.techtarget.com/sDefinition/0,,sid11_gci213391,00.html. HTML is the set of markup symbols or codes inserted in a file intended for display on a world wide web http://searchwebmanagement.techtarget.com/sDefinition/0,,sid27_gci211708, 00.html browser page. The markup language tells the web browser how to display a web page's text and images for the user.

WAP gateway 20 positions a user identifier (or user-ID) into an HTTP request packet to provide an identity for the source that initiated the request. For example, WAP gateway 20 may position a mobile station integrated services digital network (MSISDN) identifier into a request packet in order to implant or otherwise to provide an identity for the source that initiated the request packet. In a particular embodiment of the present invention, WAP gateway 20 provides the identifier in the HTTP portion of an HTTP header. Alternatively, WAP gateway 20 may transform or manipulate information in the request packet such that the source is properly identified, the source being associated with the request for information from IP network 16b. WAP gateway 20 may include any suitable software, hardware, components, or elements operable to position a unique identifier into a request packet or to transform existing packet information to reflect the identity of a source or an end user.

The user-ID represents a unique identifier that provides a correlation to a source profile or an end user profile. Thus, the user-ID provides a point of origin designation for a specific request packet propagating through communication system 10. The user-ID may serve as a temporary identifier where user-IDs are recycled continuously or the user-ID may serve as a permanent identifier where appropriate.

In a particular embodiment of the present invention, the user-ID that is positioned by WAP gateway 20 is an end user's IP address. Alternatively, the user-ID may be any element, object, or piece of data that operates to uniquely identify or distinguish an end user that generates a request packet in a network environment. For example, the user-ID may be a user name or a phone number or any other piece of data that distinguishes one end user from another.

RAN packet gateway 22 is a communications node or interface that provides a layer two or a layer three communications link or a point to point protocol (PPP) link between mobile station 12 and WAP gateway 20. RAN packet gateway 22 may also fill the role of a network access server (NAS) in providing layer two connectivity to a network. In a particular embodiment, RAN packet gateway 22 is a packet data serving node (PDSN) that includes one or more PDSN communications elements providing access to the internet, intranets, WAP servers, or any other elements operable to communicate with mobile station 12.

The PDSN communications elements may provide an access gateway for both mobile station 12 and WAP gateway 20. The PDSN communications elements may also provide a communications node between IP network 16a and mobile station 12. The PDSN communications elements may further provide foreign agent support and packet transport for virtual private networking (VPN) or for any other suitable networking configuration where appropriate. Additionally, the PDSN communications element may operate to authenticate, authorize, and provide an accounting functionality for information propagating through communication system 10.

In another embodiment of the present invention, RAN packet gateway 22 is a serving general packet radio service (GPRS) support node (SGSN), providing a communications medium in a GPRS service network environment. Where communication system 10 is implemented in a GPRS environment, a series of IP network gateways may be provided, each of which may include a gateway GPRS support node (GGSN) that works in conjunction with the SGSNs in communicating high-speed data exchanges within communication system 10.

GPRS represents a packet-based data bearer service for communication services that may be delivered as a network overlay for any type of suitable network configuration or platform. GPRS generally applies packet-radio and packet switching principles to transfer data packets in an efficient way between global system for mobile communications (GSM) mobile stations and external packet data networks. Packet switching occurs when data is split into packets that are transmitted separately and then reassembled at a receiving end. GPRS may support multiple internet communication protocols, and may enable existing IP, X.25, or any other suitable applications or protocols to operate over GSM connections.

Content switch 28 is a communication element that may identify the user-ID provided by WAP gateway 20. Content switch 28 may include any suitable hardware, software, component, or element operable to facilitate the identification of the unique identifier provided by WAP gateway 20. In a particular embodiment of the present invention, content switch 28 includes a table that matches a user-ID to its corresponding end user or source profile. In a basic or a simple case scenario, the table included within content switch 28 may be static, i.e. relatively unchanging. For example, an end user could have a user-ID that is a phone number that is generally static, the phone number in turn correlating to the end user's IP address. In some cases, where the user-ID is the end user's IP address, a table to be included in content switch 28 may be unnecessary and therefore eliminated entirely in accordance with the architecture of the present invention.

Content switch 28 operates to maintain a table of relationships and to effectively undo the address hiding or address shielding that is executed by WAP gateway 20. By interpreting a correlation between the user-ID and the end user or source profile, content switch 28 may offer a tool for providing accurate source information to elements and components within the network that may in turn offer services or enhanced capabilities to an end user based on a source profile. Alternatively, content switch 28 may be able to access a suitable database to identify the relationships between the user-IDs and the end user profiles communicating in a WAP environment.

Content switch 28 effectively communicates a request packet having the source equal to mobile station 12 and the corresponding destination to web server 40. This translation of source IP addressing information operates to identify an end user accurately. As described above, WAP gateway 20 may provide a user-ID in the request packet. Content switch 28 addresses the problem of screening an end user's IP address by translating (referred to in certain scenarios as a NAT (network address translation) execution or NATing) the WAP gateway address back to the address of the end user. The correlation between an end user and a request packet, as stored in the table, may be performed in a number of ways. This identification feature stands in contrast to systems or devices which may operate to change the source information in processing a request packet such that the new source information does not accurately reflect the origin of the request packet.

Content switch 28 may glean into the HTTP information to identify a source associated with the request packet in several ways. For example, content switch 28 may learn about an end user or a source through RADIUS packet inspection or by directly querying RAN packet gateway 22. Content switch may also learn about an end user or a source through diameter communication protocols, terminal access controller access system (TACACS) protocols, or any other communications protocol used in network applications. TACACS represents an industry standard protocol specification, RFC 1492, that forwards username and password information to a centralized server. The centralized server can either be a TACACS database or a database like the UNIX password file with TACACS protocol support. For example, the UNIX server with TACACS passes requests to the UNIX database and sends the accept or reject message back to the access server. Content switch 28 may also perform any necessary decrypting protocols or other suitable transformations where appropriate as a request packet propagates through communication system 10.

The table included within content switch 28 may be populated in a variety of ways. For example, when an end user connects to the network, a RADIUS request is made on its behalf by a NAS, such as for example RAN packet gateway 22. In a mobile networking scenario, this request, called an Access-Request, may contain the user-ID in the User-Name attribute or in the Calling Station-ID attribute, which uniquely identifies the end user requesting the information from the network. If AAA server 36 authenticates and authorizes the user successfully, a RADIUS Access-Accept message may be communicated back to the RADIUS client (WAP gateway 20 or a NAS) with an IP address in the Framed-IP Address attribute. This IP address is the address used by the WAP client or an end user when it sends IP packets to WAP gateway 20. Content switch 28 inspects the RADIUS packets exchanged and builds a table that binds a user-ID with an assigned IP address. It should be appreciated that content switch 28 may also glean this information from RADIUS Accounting-Request packets sent by the NAS on behalf of the end user.

Entries within the table may be cleaned up, deleted, or updated periodically (or alternatively updated or changed based on some event or modification to system parameters) in order to accurately reflect one or more source profiles associated with one or more end users of mobile station 12. Entries could also be deleted specifically or deleted per communications flow. In the case of RADIUS messaging, the population of the table may be controlled by RADIUS accounting messages or by any other suitable populating protocol according to particular needs.

The table within, or external to, content switch 28 allows an end user or a client to be accurately identified by the user-ID that was placed in a request packet by WAP gateway 20. Content switch 28 may search its local table to find the assigned IP address for the corresponding end user or client. Content switch 28 may then translate the source IP address from the WAP gateway address to the IP address provided in the table that stores the relationships between the user-ID and the corresponding source profiles.

CSPG 32 is a client-aware device that may provide or offer some service or feature to an end user. Such services are based on an effective mapping between a source IP address of a given request packet and a user profile. These client-aware devices may key off the source IP address in providing services to an end user. There are a number of reasons why a device or a component would want to identify the source or the end user of mobile station 12. For example, some devices may wish to identify an end user for authorization purposes. In another example, a device may wish to maintain user profiles to provide for accounting records (for example per-user accounting) or to provide for content billing information. Alternatively, a device or a component may use an identifier to provide for any other type of suitable client-aware service, tool, or feature according to particular needs of network components or equipment. Additional services may be related to areas such as routing, accounting, firewalling, filtering, or any other suitable parameters or policies where user-aware characteristics serve as a basis for service implementation.

As described above, CSPG 32 requires the identity of the client or the end user in order to provide services based on a source profile. In a particular embodiment of the present invention, CSPG 32 provides client-aware services by operating at networking layers 2 and 3. Accordingly, the information available at networking layers 2 and 3 provides a basis for the identification of an end user or a client. CSPG 32 may use an IP address or any other suitable parameter to uniquely identify a client or an end user in offering a service, enhanced capability, or feature to an end user. CSPG 32 may include any suitable hardware, software, components, or elements that identify a unique identifier in order to provide some networking feature or capability to an end user.

In an alternative embodiment of the present invention, CSPG 32 and content switch 28 may be provided within WAP gateway 20. In such an embodiment, content switch 28 behaves in the same manner as described above in identifying the user-ID and correlating it to an end user's IP address. Additionally, CSPG 32 behaves in a similar manner as described above in identifying an end user's IP address in order to provide a service or policy to a particular group of end users.

In operation, CSPG 32 matches a source IP address with a user profile. This may be accomplished in a variety of ways. For example, upon receipt of a request packet from a client or an end user, CSPG 32 may query a database or otherwise proxy RADIUS flows that are going to AAA server 36. By gleaning into the RADIUS packets flowing within communication system 10, CSPG 32 may learn information about an end user, source, or client based on the RADIUS packet propagation. For example, Access Requests, Access Accepts, Accounting Requests, and Accounting Acknowledgments may include information that CSPG 32 may use in identifying an end user or source.

The coordination of CSPG 32 and content switch 28 provides a model that may be used in conjunction with caches or proxies. Caches or proxies may operate to maintain or otherwise temporarily store source IP address data while identification of the user-ID occurs. Alternatively, CSPG 32 and content switch 28 may be used in conjunction with other elements that facilitate such identification, allowing a correlation to be made between a user-ID and an end user or source profile.

AAA server 36 is a server program that handles end user requests for access to networking resources. Networking resources refers to any device, component, or element that provides some functionality to an end user communicating in communication system 10. For a corresponding network, AAA server 36 also provides authentication, authorization, and accounting services and management. Authorization generally refers to the process of giving an end user permission to do or to access something. In multi-user computer systems, a system administrator may define for the system which end users are allowed access to given data in the system and, further, what privileges for an end user are provided. Once an end user has logged into a network, such as for example IP network 16a, the network may wish to identify what resources the end user is given during the communication session. Thus, authorization within communication system 10 may be seen as both a preliminary setting up of permissions by a system administrator and the actual checking or verification of the permission values that have been set up when an end user of mobile station 12 is attempting access. Authentication generally refers to the process of determining whether an end user is in fact who or what it is declared to be.

In the case of private or public computer networks, authentication may be commonly done through the use of unique identification elements (such as an MSISDN in a particular embodiment of the present invention) or log-on passwords. Knowledge of the password offers a presumption that the end user is authentic. Accounting generally refers to tracking usage for each end user or each network and may additionally include trafficking information or data relating to other information flows within communication system 10 or within a particular sub-network.

AAA server 36 may receive the IP address and other parameters from any suitable source, such as CSPG 32 or alternatively from a dynamic host configuration protocol (DHCP) server or a domain name system (DNS) database element, in order to direct data to be communicated to mobile station 12. AAA server 36 may include any suitable hardware, software, components, or elements that operate to receive data associated with an end user and provide corresponding AAA related functions to network components within communication system 10. Authorization and IP address management may be retrieved by AAA server 36 from a layer two tunneling protocol network server (LNS), which may be provided to address secure services for an end user of mobile station 12 where appropriate. The assigned IP address may be a private or a routable IP address. On assignment of the IP address, the DHCP server may perform update procedures for updating the assigned IP address and leasing parameters for the end user of mobile station 12.

Web server 40 represents a program that, using the client/server model and the world wide web's HTTP, serves the files that form web pages to web users. For purposes of teaching the present invention, an example web server 40, yahoo.com, is provided and offers information sought to be retrieved by mobile station 12. Web server 40 may be provided as part of a larger package of internet and intranet-related programs for serving e-mail, downloading requests for file transfer protocol (FTP) files, building and publishing web pages, or any other suitable network operations according to particular needs.

Figure 2:
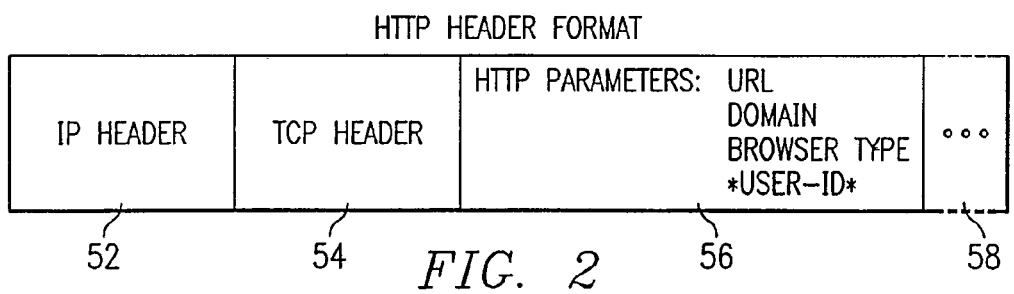
FIG. 2 is a simplified block diagram of a hyper-text transfer protocol (HTTP) header format, which includes a unique identifier associated with a source that communicates in the WAP network environment.

FIG. 2 is a block diagram of an HTTP header format 50 in accordance with one embodiment of the present invention. HTTP header format 50 is provided to illustrate that a unique identifier may be positioned anywhere such that it provides a correlation between an end user and a request packet as it propagates through communication system 10. HTTP header format 50 comprises an IP header 52, a TCP header 54, a set of HTTP parameters 56, and a miscellaneous header portion 58. The set of HTTP parameters 56 may include any suitable information, such as for example data relating to a URL, a domain, or a browser type. In a particular embodiment of the present invention, HTTP parameters section 56 includes a user-ID inserted by WAP gateway 20. The user-ID provides a correlation between an end user or source and the request packet initiated by mobile station 12. Alternatively, the user-ID, or any other unique identifier, may be inserted in proprietary IP header options, proprietary TCP header options, or in miscellaneous header portion 58.

Figure 3:
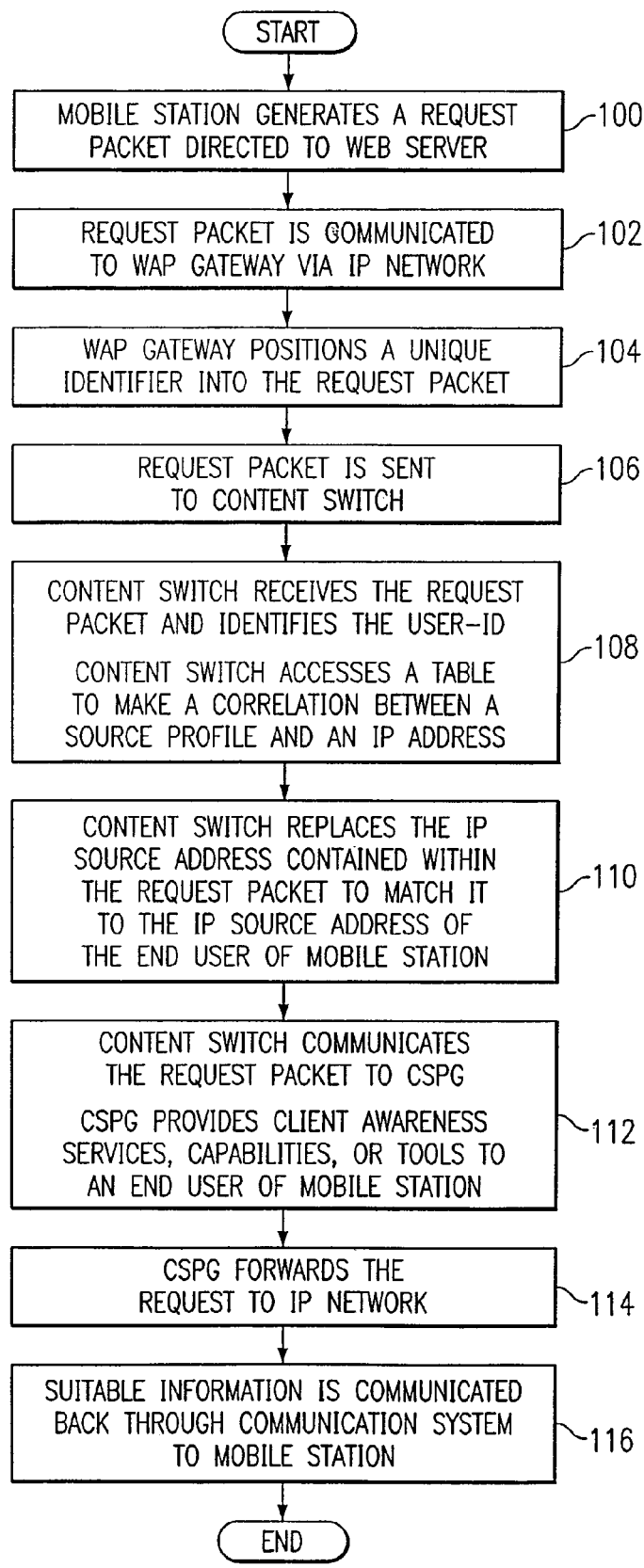
FIG. 3 is a flowchart illustrating a series of steps associated with a method for providing source awareness in a WAP network environment.

FIG. 3 is a flowchart illustrating a series of steps associated with a method for providing source awareness in a WAP network environment. The method begins at step 100, where mobile station 12 initiates a request for a piece of data or information, such as for example a uniform resource locator (URL) for yahoo.com. The end user may initiate or otherwise open a WML (or more specifically a wireless session protocol (WSP)) session to WAP gateway 20. The end user may send a WML "get" packet (within a WML packet) to WAP gateway 20 as illustrated in step 102. The source in initiating this process is mobile station 12 with the destination address or destination IP being WAP gateway 20. WAP gateway 20 generates a request in HTTP/HTML format on behalf of mobile station 12. Once the response is later received from IP network 16b, WAP gateway 20 will convert the HTTP/HTML response into a suitable WAP format providing translated content to mobile station 12.

In step 104, WAP gateway 20 positions a user-ID or a unique identifier into the request packet and then sends the request packet to content switch 28 as illustrated in step 106. At step 108, content switch 28 receives the request packet and identifies the user-ID. Content switch 28 may then access its internal table, or an external table or database, in making a correlation between a source profile or an end user and an IP address. At step 110, content switch 28 may then translate the IP source address contained within the request packet to match the IP source address of the end user of mobile station 12 that originated the request for information within communication system 10. Content switch 28 may then communicate the request packet to CSPG 32 at step 112.

CSPG 32 may now perform adequate client awareness services in providing capabilities or tools to an end user of mobile station 12 because the request packet now includes a proper source identifier as indicated by the corresponding IP address. Additionally, CSPG 32 may access AAA server 36 in authenticating, authorizing, or providing accounting features to an end user of mobile station 12. At step 114, CSPG 32 may then forward the request on to IP network 16b, which may in turn suitably process the request packet or otherwise communicate the request packet to web server 40 in retrieving the requested information. At step 116, the information may then be suitably communicated back through communication system 10 via WAP gateway 20 and on to mobile station 12 and thereby satisfy the original query or request provided by mobile station 12. Mobile station 12 may then initiate another request or query to IP network 16b where appropriate and generate a corresponding request packet that propagates in a similar fashion through communication system 10.

Communication system 10 may be used in a host of communications environments, such as for example in conjunction with a code division multiple access (CDMA) network. In a CDMA environment, all users of the CDMA system use the same carrier frequency and may transmit simultaneously. Each user has his own pseudo-random code word. Whenever an end user of mobile station 12 that is using CDMA wishes to transmit, an associated system may correlate a message signal with the code word. The receiver performs decorrelation on the received signal. For detection of the message signal, the receiver identifies the code word used by the transmitter. Because many users of the CDMA system share the same frequency, CDMA systems could benefit from the teachings of the present invention in providing an accurate and efficient routing protocol for information packets generated by mobile station 12. IS-95 may also utilize the CDMA scheme in conjunction with the present invention.

Time division multiple access (TDMA) represents another protocol in which the disclosed configuration of communication system 10 may be implemented. In a TDMA access scheme, a set of end users or multiple mobile stations 12 are multiplexed over the time domain, i.e. user U1 uses radio frequency F1 for time period T1 after which user U2 uses the same frequency F1 for time T1 and so on. The time axis is divided into equal length time slots. In TDMA, each user occupies a cyclically repeating time slot defining a channel with N time slots making up a frame. In using TDMA, it is possible to allocate different numbers of time slots per frame to different end users. Thus bandwidth can be supplied on demand to different users depending on user needs. GSM and the IS-54/IS-136-based United States Digital Cellular (USDC) system are some of the standards that may use TDMA in conjunction with the present invention. The source information approach for request packets propagating through communication system 10, may be implemented in a TDMA system in order to accurately identify an end user.

Frequency division multiple access (FDMA) represents another communications environment in which communication system 10 may be employed. The FDMA system assigns individual frequency channels or bands to individual users whereby all users may transmit at the same time. These channels are assigned on demand to users requesting service. During the call no other user can share the same frequency band. A FDMA channel carries only one communications exchange or session, e.g. phone call, at a time. One or more mobile stations 12, which may be used in conjunction with a FDMA system, may implement duplexers because both the transmitter and receiver operate at the same time. The Advanced Mobile Phone Service (AMPS) and the European Total Access Communication System (ETACS) are some of the standards that may use FDMA in conjunction with the source identification approach of the present invention.

Although the present invention has been described in detail with reference to particular embodiments, it should be understood that various other changes, substitutions, and alterations may be made hereto without departing from the spirit and scope of the present invention. For example, although the present invention has been described as operating in PDSN or GGSN environments, the present invention may be used in any networking environment that routes or processes information based on the identity of an end user of mobile station 12. The source identification protocol disclosed in the preceding figures is generally applicable to all communication systems in which information packets are routed between or through IP networks.

Additionally, although the present invention has been described with reference to communications between mobile station 12 and IP networks 16a and 16b, the source identification protocol described herein may be implemented for communications between any components within or external to a mobile network. The present invention has merely described mobile station 12 and IP networks 16a and 16b for teaching and instructional purposes. This should not be construed to limit how or where the source identification protocol of the present invention is implemented. Moreover, the processing and routing configurations disclosed above may be implemented in conjunction with any component, unit, hardware, software, object, or element involved in the communications process.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

In order to assist the United States Patent and Trademark Office (USPTO) and additionally any readers of any patent issued on this application in interpreting the claims appended hereto, Applicants wish to note that they do not intend by any statement in the specification to limit their invention in any way that is not otherwise reflected in the appended claims.

What is claimed is:

1. A method comprising:
    enlisting one or more end users in a billing plan associated with wireless application protocol (WAP) network communications;
    generating a bill associated with at least one end user of the one or more end users, the bill being based on the billing plan; and
    facilitating, by a content switch, the network communications for the at least one end user in response to the one or more end users being enlisted in the billing plan, whereby the network communications includes a protocol that comprises:
        receiving, by the content switch, a request packet for network communications generated by a gateway on behalf of a mobile station operating as a source that initiated the request packet, the request packet comprising an identifier identifying the mobile station and a source address identifying the gateway; and
        replacing, by the content switch, the source address of the request packet with an internet protocol (IP) address, the IP address identifying the mobile station.

2. The method of claim 1, further comprising providing a table that includes one or more identifiers that correlate to one or more sources respectively, a source being operable to generate one or more request packets for the network communications.

3. The method of claim 1, further comprising:
    matching the IP address with one or more source profiles in order to provide one or more networking services to the source that initiated the request packet.

4. The method of claim 3, wherein the matching is performed by accessing and querying a database.

5. The method of claim 3, wherein the matching is performed by inspecting one or more RADIUS packets associated with the source that initiated the request packet.

6. The method of claim 3, further comprising authenticating the source that initiated the request packet.

7. The method of claim 6, further comprising authorizing the source that initiated the request packet.

8. The method of claim 6, further comprising providing a plurality of accounting services for the source that initiated the request packet, the accounting services comprising the generating the bill.

9. The method of claim 1, further comprising providing a communications link between a radio access network (RAN) packet gateway and the mobile station.

10. An apparatus for communicating in a wireless application protocol (WAP) network environment, comprising:
    a content switch associated with a gateway and operable to:
        receive a request packet for WAP network communications generated by the gateway on behalf of a mobile station operating as a source that initiated the request packet, the request packet comprising an identifier identifying the mobile station and a source address identifying the gateway;
        replace the source address of the request packet with an internet protocol (IP) address, the IP address identifying the mobile station.

11. The apparatus of claim 10, wherein the gateway comprises the content switch, and wherein the content switch comprises a table that includes one or more identifiers that correlate to one or more sources respectively, a source being operable to generate one or more request packets in the WAP network environment.

12. The apparatus of claim 10, further comprising:
    a client service packet gateway (CSPG) operable to receive the request packet from the content switch and to match one or more IP addresses with one or more source profiles in order to provide one or more networking services to the source that initiated the request packet.

13. The apparatus of claim 12, wherein the CSPG and the content switch are included in the gateway.

14. The apparatus of claim 12, wherein the matching is performed by accessing and querying a database.

15. The apparatus of claim 12, wherein the matching is performed by inspecting one or more RADIUS packets associated with a selected one or more sources.

16. The apparatus of claim 10, further comprising:
a radio access network (RAN) packet gateway operable to provide a communications link between the RAN packet gateway and the mobile station.

17. The apparatus of claim 10, further comprising:
a database coupled to the content switch and operable to store a table that includes one or more identifiers that correlate to one or more sources respectively, a source being operable to generate one or more request packets in the WAP network environment.

* * * * *